United States Patent Office 3,640,894
Patented Feb. 8, 1972

3,640,894
COMPOSITIONS AND PROCESSES FOR BREAKING PETROLEUM EMULSIONS
Ronald G. Sampson, Huntington Beach, Calif., assignor to Nalco Chemical Company, Chicago, Ill.
No Drawing. Filed July 9, 1970, Ser. No. 53,709
Int. Cl. B01d 17/04
U.S. Cl. 252—344                          10 Claims

ABSTRACT OF THE DISCLOSURE

Compositions of matter and a process breaking water-in-oil petroleum emulsions therewith, which compositions comprise a substantially water-insoluble at least partially oil-soluble product formed by the combination of (a) a diisocyanate and a polyoxyalkylated compound and (b) polyoxyalkylated alkyl phenolformaldehyde polycondensates is disclosed.

INTRODUCTION

Petroleum emulsions are commonly encountered in the production, handling and refining of crude mineral oil. Petroleum emulsions are, in general, of the water-in-oil type wherein oil acts as the continuous phase for dispersion of the finely-divided particles of naturally occurring waters or brines. These emulsions are often extremely stable and will not resolve into the oil and water components even on long standing. The emulsions obtained from producing wells and from the bottom of crude oil storage tanks are commonly referred to as "cut oil," "emulsified oil," "bottom settlings" and "B.S." It is also to be understood that water-in-oil emulsions may occur artificially, resulting from any one or more of numerous operations encountered in various industries.

One type of process involves subjecting emulsions of the water-in-oil type to the action of a demulsifying agent of the kind hereinafter described, thereby causing the emulsion to resolve and stratify into its component parts of oil and water or brine, when the emulsion has been allowed to stand in a relatively quiescent state.

One object of the present invention is to provide novel, economical and effective processes for resolving emulsions of the character referred to into their component parts of oil and water or brine.

Another object is to provide demulsifying compositions exhibiting improved, emulsion-breaking efficacy and improved water-coalescing power in comparison to the compositions described and claimed in the aforesaid pending application.

Still another object is to provide more effective processes for resolving petroleum emulsions into their component parts of oil and water with the aforesaid improved demulsifying compositions. Other objects, advantages and features of the invention are described hereinafter.

THE INVENTION

This invention concerns a process for breaking petroleum emulsions of the water-in-oil type which comprises subjecting said emulsion to the demulsifying action of a substantially water-insoluble, at least partially oil-soluble product comprising:
(A) A copolymer formed as the reaction product of:
(1) from about 1 to 15% by weight of a diisocyanate, and
(2) from about 85 to 99% by weight of a polyoxyalkylated compound selected from the group consisting of compounds having the formula:

$$H(OCH_2CH_2CH_2)_x(OR_1)_yOR_2$$

where $y$ is an integer from 2 to 70; $R_1$ is a radical selected from the group consisting of $-CH_2CH_2-$ and $$-CH_2-CH- \atop \phantom{-CH_2-}CH_3$$

$R_2$ is a radical selected from the group consisting of $-H$ and $-CH(CH_2CH_2OH)_2$; and $x$ is an integer from 0 to 40; and polyoxyalkylated alkyl phenol-formaldehyde polycondensates having the formula:

$$H[OC_6H_3-CH_2-C_6H_3O]_a(-CH_2CHO)_b(R_1O)_cH \atop \phantom{H[OC_6H_3-CH_2-C_6H_3O]_a(-CH_2}CH_3$$

with $R_3$ substituents on the phenol rings.

where $a$ is an integer from 1 to 8; $b$ is an integer from 1 to 40; $c$ is an integer from 0 to 40; $R_1$ is a radical selected from the group consisting of $-CH_2CH_2-$ and $$-CH_2CH- \atop \phantom{-CH_2}CH_3$$

and $R_3$ is a hydrocarbon group having from 4 to 12 carbon atoms in chain length; and (B) Polyoxyalkylated alkyl phenol-formaldehyde polycondensates having the formula:

$$H[OC_6H_3-CH_2-C_6H_3O]_a(-CH_2CHO)_b(R_1O)_cH \atop \phantom{H[OC_6H_3-CH_2-C_6H_3O]_a(-CH_2}CH_3$$

where $a$ is an integer from 1 to 8; $b$ is an integer from 1 to 40; $c$ is an integer from 0 to 40; $R_1$ is a radical selected from the group consisting of $-CH_2CH_2-$ and $$-CH_2CH- \atop \phantom{-CH_2}CH_3$$

and $R_3$ is a hydrocarbon group having from 4 to 12 carbon atoms in chain length.

More specifically, the process comprises using a diisocyaante which has the formula:

$$O=C=N-R-N=C=O$$

where R is a hydrocarbon radical having from 4 to 14 carbon atoms.

More preferably, this invention comprises using a copolymer formed as the reaction product of a diisocyanate having the formula:

$$O=C=N-R-N=C=O$$

where R is a radical selected from the group consisting of $-(CH_2)_6-$, $-C_6H_4-$, $$CH_3 \atop | \atop -C_6H_3$$

and $-C_6H_4-CH_2-C_6H_4-$; and a polyoxyalkylated product.

The ratio of $A{:}B$ can vary widely but usually is within the range of from 20:80 to 80:20 by weight.

This invention also contemplates a composition comprising:
(A) A copolymer formed as the reaction product of:
(1) from about 1 to 15% by weight of a diisocyanate, and
(2) from about 85 to 99% by weight of a polyoxyalkylated compound selected from the group consisting of compounds having the formula:

$$H(OCH_2CH_2CH_2)_x(OR_1)_yOR_2$$

where $y$ is an integer from 2 to 70; $R_1$ is a radical selected from the group consisting of —$CH_2CH_2$— and —$CH_2$ $$-CH_2-CH-\atop |\atop CH_3$$

$R_2$ is a radical selected from the group consisting of —H and —$CH(CH_2CH_2OH)_2$; and $x$ is an integer from 0 to 40; and polyoxyalkylated alkyl phenol-formaldehyde polycondensates having the formula:

$$H[OC_6H_3-CH_2-C_6H_3O]_a(-CH_2CHO)_b(R_1O)_cH\atop |\qquad\qquad|\qquad\qquad\qquad\qquad|\atop R_3\qquad\qquad R_3\qquad\qquad\qquad\qquad CH_3$$

where $a$ is an integer from 1 to 8; $b$ is an integer from 1 to 40; $c$ is an integer from 0 to 40; $R_1$ is a radical selected from the group consisting of —$CH_2CH_2$— and $$-CH_2CH-\atop |\atop CH_3$$

and $R_3$ is a hydrocarbon group having from 4 to 12 carbon atoms in chain length; and (B) Polyoxyalkylated alkyl phenol-formaldehyde polycondensates having the formula:

$$H[OC_6H_3-CH_2-C_6H_3O]_a(-CH_2CHO)_b(R_1O)_cH\atop |\qquad\qquad|\qquad\qquad\qquad\qquad|\atop R_3\qquad\qquad R_3\qquad\qquad\qquad\qquad CH_3$$

where $a$ is an integer from 1 to 8; $b$ is an integer from 1 to 40; $c$ is an integer from 0 to 40; $R_1$ is a radical selected from the group consisting of —$CH_2CH_2$— and $$-CH_2-CH-\atop |\atop CH_3$$

and $R_3$ is a hydrocarbon group having from 4 to 12 carbon atoms in chain length.

More specifically, the composition comprises the diisocyanate having the formula:

$$O=C=N-R-N=C=O$$

where R is a hydrocarbon radical having from 4 to 14 carbon atoms.

Preferably, the composition comprises a diisocyanate having the formula:

$$O=C=N-R-N=C=O$$

where R is a radical selected from the group consisting of —$(CH_2)_6$—, —$C_6H_4$—, $$-C_6H_4-\atop |\atop CH_3$$

and —$C_6H_4CH_2C_6H_4$—.

THE COPOLYMER

As previously described, the copolymer is formed as the reaction product of a diisocyanate and an oxyalkylated product.

Some typical diisocyanates that could be used are listed in Table I. Some physical properties are listed in Table II.

TABLE I

| Diisocyanate No.: | Typical diisocyanates |
|---|---|
| B1 | Toluene diisocyanate (TDI). |
|  | (1) 80–20 mixture. |
|  | (2) 65–35 mixture. |
| B2 | 4,4'-diphenylmethane diisocyanate (MDI). |
| B3 | p-Phenylene diisocyanate. |
| B4 | m-Phenylene diisocyanate. |
| B5 | Hexamethylene diisocyanate. |

TABLE II

| Compound | Melting point, °C | Boiling point, °C | Specific gravity | Refractive index, $n_D$ | Flash point, open-cup, °C |
|---|---|---|---|---|---|
| 1. Hexamethylene diisocyanate | | $127_{11}$ | $1.05_4^{20}$ | $1.4530^{20}$ | 140 |
| 2. m-Phenylene diisocyanate | 51 | $110_{11}$ | | $1.5573^{60}$ | 107 |
| 3. 2,4-toluene diisocyanate | 22 | $120_{10}$ | $1.22_{15}^{25}$ | $1.5654^{25}$ | 132 |
| 4. 80/20-toluene diisocyanate [1] | [2] 11–14 | $120_{10}$ | $1.22_{15}^{25}$ | $1.5666^{25}$ | 132 |
| 5. 65/35-toluene diisocyanate [3] | [2] 3–5 | $120_{10}$ | $1.22_{15}^{25}$ | $1.5663^{25}$ | 132 |
| 6. 4,4'-diphenylmethane diisocyanate | 38 | $196_{0.5}$ | $1.19^{50}$ | $1.5906^{50}$ | 201 |
| 7. Dianisidine diisocyanate | 116+ | $200-210_{0.5}$ | | | 245 |
| 8. Tolidine diisocyanate | 69+ | $160-170_{0.5}$ | | | 214 |

[1] 80/20 refers to the ratio of 2,4-toluene diisocyanate.
[2] Freezing point.
[3] 65/35 refers to the ratio of 2,6-toluene diisocyanate.

These tables are merely exemplary and should not limit the diisocyanates that could be used in this invention.

The second constituent of the copolymer is a polyoxyalkylated product selected from the group consisting of compounds having the formula:

$$H(OCH_2CH_2CH_2)_x(OR_1)_yOR_2$$

where $y$ is an integer from 2 to 70; $R_1$ is a radical selected from the group consisting of —$CH_2CH_2$— and $$-CH_2CH-\atop |\atop CH_3$$

$R_2$ is a radical selected from the group consisting of —H and —$CH(CH_2CH_2OH)_2$; and $x$ is an integer from 0 to 40; and polyoxyalkylated alkyl phenol-formaldehyde polycondensates having the formula:

$$H[OC_6H_3-CH_2-C_6H_3O]_a(-CH_2CHO)_b(R_1O)_cH\atop |\qquad\qquad|\qquad\qquad\qquad\qquad|\atop R_3\qquad\qquad R_3\qquad\qquad\qquad\qquad CH_3$$

where $a$ is an integer from 1 to 8; $b$ is an integer from 1 to 40; $c$ is an integer from 0 to 40; $R_1$ is a radical selected from the group consisting of —$CH_2CH_2$— and $$-CH_2CH-\atop |\atop CH_3$$

and $R_3$ is a hydrocarbon group having from 4 to 12 carbon atoms in chain length.

Preferably the polyoxyalkylated product is a polypropylene glycol, a polypropylene glycol plus a sequential ethylene oxide adduct, a polypropylene glycol plus a mixed ethylene oxide and propylene oxide adduct, an oxypropylated glycerin, an oxypropylated glycerin plus a mixed ethylene oxide and propylene oxide adduct, an oxypropylated alkyl phenol-formaldehyde resin, an oxypropylated alkyl phenol-formaldehyde resin plus an ethylene oxide adduct and an oxypropylated alkyl phenol-formaldehyde resin plus a mixed ethylene oxide and propylene oxide adduct.

The following table lists ethylene oxide adducts of certain backbone acceptors. The backbone acceptors are the base materials. For instance, typical base materials could be polypropylene glycol, propoxylated glycerin, t-butyl phenol-formaldehyde resins and nonyl-phenol-formaldehyde resins.

TABLE III

| Composition No. | Backbone acceptor | Adduct in moles ETO |
|---|---|---|
| A1 | PPG 3600 | 0 |
| A5 | PPG 3600 | 4.0 |
| A15 | PPG 3650 | 33.7 |
| A20 | PPG 3950 | 5.4 |
| A40 | Glycerin derivative [1] | 30.0 |
| A50 | Polycondensate [2] | 2.0 |
| A52 | do. [2] | 4.0 |

[1] Glycerin and propylene oxide mol. wt. 6,000.
[2] t-butyl-phenol-formaldehyde resin and propylene oxide mol. wt. 1,500.

Typical procedure for preparing polyoxylated products is given in the following example. By adjusting the ingredients and the amounts of the ingredients various other products can be produced.

Example I

To an autoclave equipped with a means of mechanical stirring, heating and cooling, 4.7 parts of dipropylene glycol and 0.25 part potassium hydroxide were added. The contents of the autoclave were heated to 125° C. At this temperature 1,2-propylene oxide was slowly introduced from a transfer bomb which contained 92.8 parts of 1,2-propylene oxide; cooling was applied during the addition to maintain the temperature below 130° C. with a pressure of 60–75 p.s.i. Approximately two hours were required to introduce the 1,2-propylene oxide; the reaction mass was maintained at 130° C. for four hours to insure that the unreacted 1,2-propylene was at a minimum. 2.5 parts of ethylene oxide was added from a transfer bomb at such a rate that the temperature was maintained between 150° C. to 160° C. with a pressure of 60–75 p.s.i. After all of the ethylene oxide had been added, the temperature was held at 150° C. for an additional hour to complete the reaction. The molecular weight of the final product was approximately 1950.

The other products listed in Table III were similarly produced.

ALKYL PHENOL-FORMALDEHYDE CONDENSATION

The phenol-formaldehyde condensation products are prepared by reacting formaldehyde or a substance which breaks down to a formaldehyde under the reaction conditions, e.g., paraformaldehyde and trioxane, and a difunctional alkyl phenol, often preferably crude mixture of alkyl phenols for economic reasons, by heating the reactants at 100–125° C. in the presence of a small amount of an acid catalyst such as sulfamic acid or muriatic acid and preferably under substantially anhydrous conditions—excepting the water produced during the reaction. The aqueous distillate which begins to form is collected and removed from the reaction mixture. After several hours of heating at temperatures slightly above the boiling point of water, the mass becomes viscous and is permitted to cool to about 100 to 105° C. At this point a suitable hydrocarbon fraction is added, and heating is resumed. Further aqueous distillate begins to form, and heating is continued for an additional number of hours until at least about one mol of aqueous distillate per mol of the formaldehyde has been secured. The temperature at the end of the reaction reached about 150–180° C. The product is permitted to cool to yield the phenol-formaldehyde condensation product in a hydrocarbon solvent. The molecular weight of these intermediate condensation products cannot be ascertained with certainty, but we would approximate that the resin employed herein should contain about 4 to 15, preferably 4 to 10, phenolic nuclei per resin molecule. The solubility of the condensation product in hydrocarbon solvent would indicate that the resin is a linear type polymer, thus distinguishing them from the more common phenol-formaldehyde resins of the crosslinked type. To produce the t-butyl or nonyl phenol-formaldehyde resins listed in Table III, the appropriate starting material is used. Oxyalkylation can be accomplished according to the following procedure.

OXYALKYLATION OF THE ALKYL PHENOL-FORMALDEHYDE CONDENSATION PRODUCT

Having prepared the intermediate phenol-formaldehyde products, the next step is the oxyalkylation of the condensation products with the alkylene oxides having 2–3 carbons. This is achieved by mixing the intermediate phenol-formaldehyde condensation product in a hydrocarbon solvent with a small amount of a suitable catalyst in an autoclave. The condensation product is heated above 100° C. and ethylene oxide or a mixture of ethylene oxide and propylene oxide, either as a mixture of by sequential addition of first either the propylene oxide or the ethylene oxide and later the other oxide, is charged into the autoclave until the pressure is in the vicinity of 75–100 p.s.i.

The reaction mixture is gradually heated until an exothermic reaction begins. The external heating is then removed, and alkylene oxide is added at such a rate that the temperature is maintained between about 130–160° C. in a pressure range of 80 to 100 p.s.i. After all of the alkylene oxide has been added, the temperature is maintained for an additional 10 to 20 minutes to assure substantially complete reaction of the alkylene oxide. The resulting product is the alkylene oxide adduct of an alkyl phenol-formaldehyde condensation product, in which the weight ratio of the oxide to the condensation product is between about 1:5 and 15:1, preferably between about 1:5 and 5:1.

As can readily be seen, the polyoxyalkylated alkyl phenol-formaldehyde polycondensate is used as the second component in the emulsion breaker and can also be used to react with the diisocyanate to form the copolymer.

COPOLYMERS AS REACTION PRODUCTS

To prepare the copolymer the diisocyanate and polyoxyalkylated compound are reacted at from 40 to 120° C. for from 5 minutes to 3 hours. This reaction is relatively simple and fast. Once the ingredients are combined at the appropriate temperature, the reaction is practically simultaneous. But the temperature is maintained for some time to be sure that it is complete. Following is an exemplary procedure for preparing the copolymers.

PROCEDURE FOR PREPARING COPOLYMERS (1) Add 200 grams polypropylene glycol, molecular weight 38,000 to 4000, with 15 moles of ethylene oxide adduct, and 2 grams glacial acetic acid, to a 1000 ml. 3-neck flask, equipped with a mechanical stirrer and thermometer.

(2) Heat while stirring to 60° C. (140° F.) and maintain for 30 minutes.

(3) Slowly add 6 grams toluene diisocyanate; hold 15 minutes.

(4) Heat to 100° C. (212° F.) and maintain for one hour.

(5) Cool and add solvent to make a solution.

The solvent can be any standard hydrocarbon solvent.

Following is Table IV, which lists copolymers prepared by reacting the polyoxyalkylated products of Table III with the diisocyanates of Table I.

TABLE IV

| Reaction No. | Composition No. | Weight percent | Diisocyanate No. | Weight percent |
|---|---|---|---|---|
| C1 | A1 | 96.9 | B1 | 3.1 |
| C5 | A5 | 96.5 | B1 | 3.5 |
| C16 | A15 | 98.7 | B1 | 1.3 |
| C23 | A20 | 97.2 | B1 | 2.8 |
| C43 | A40 | 98.1 | B1 | 1.9 |
| C53 | A50 | 98.9 | B1 | 1.1 |
| C55 | A52 | 99.4 | B1 | 0.6 |

The last step in preparing the emulsion breakers is combining the copolymers of Table IV with the polyoxyalkylated resins of the following Table V.

TABLE V

| | Weight percent | | |
|---|---|---|---|
| Composition No. | Nonylphenol-formaldehyde | Ethylene oxide | Propylene oxide |
| D1 | 50 | 37.5 | 12.5 |
| D2 | 50 | 25.0 | 25.0 |

Other polyoxyalkylated alkyl phenol-formaldehyde polycondensates could be used as well as various ratios of ethylene oxide and propylene oxide.

The following Table VI is the various percentages of the copolymers from Table IV and the polycondensates of Table V.

TABLE VI

| Product No. | Composition No. | Weight percent | Resin No. | Weight percent |
|---|---|---|---|---|
| E1 | C1 | 40 | D1 | 60 |
| E5 | C5 | 40 | D1 | 60 |
| E34 | C16 | 100 | | |
| E36 | C16 | 90 | D1 | 10 |
| E55 | C23 | 100 | | |
| E85 | C43 | 40 | D1 | 60 |
| E113 | C53 | 100 | | |
| E114 | C53 | 80 | D1 | 20 |
| E115 | C53 | 40 | D1 | 60 |
| E119 | C55 | 100 | | |
| E121 | C | 40 | D1 | 60 |

In order to test the effectiveness of these compositions, the following bottle test procedure was used.

BOTTLE TESTING OF CRUDE OIL EMULSIONS

The bottle testing of crude oil emulsions is conducted according to the following procedure: Fresh samples of the emulsion-breaking chemicals in organic solvent solution are prepared in 10% solutions. These solutions are made by accurately diluting 10 milliliters of the emulsion breaking chemicals in 90 milliliters of a mixture of equal parts of anhydrous isopropyl alcohol and an aromatic hydrocarbon such as xylene. The mixture is agitated well until the emulsion breaking chemical is completely dissolved.

The equipment for running the crude oil emulsion breaking test, in addition to the foregoing 10% solutions, includes a set of six ounce graduated prescription bottles, a funnel, a graduated 0.2 milliliter pipette, a thief pipette, a centrifuge, centrifuge tubes and a thermometer. The graduated prescription bottles are filled to the 100 milliliter mark with the crude oil emulsion to be tested, preferably a sample which has been recently collected. If there is any free water in the crude oil emulsion sample collected, it is bled off before the bottles are filled. Each bottle is inverted several times with the bottle capped so that the bottle will be coated with an emulsion film.

By means of the 0.2 milliliter pipette, the prescribed volume of the 10% solution of the emulsion breaking chemical is added to the emulsion in the bottles. The bottles are then capped and given manual agitation for a predetermined number of counts. The number of counts are determined by a survey of the agitation which can be secured in the system in which the crude oil emulsion is being used. If the emulsion requires heat for treatment, the bottles are placed in hot water bath, the length of time and temperature determined by the particular plant equipment and practice in which the particular emulsion is employed. If the plant provides for hot agitation of the emulsion the bottles may be given a corresponding amount of manual hot agitation.

The bottles are then removed from the hot water bath and the water drop, presence of the bottom settlings (B.S.) layer and color and general appearance of the oil are noted.

A thief grind-out is taken on all bottles which appear to be promising. A thief grind-out is made by preparing centrifuge tubes filled with gasoline to the 50% mark. The thief pipette is set to the proper length by adjusting the rubber stopper so that the bottom of the pipette is about ¼ inch above the oil-water level of the bottle with maximum water drop. This same setting is used for all subsequent thiefings on remaining bottles. The thiefed oil from each bottle is added to the centrifuge tube to the 100% mark, and the tube is shaken. The samples are then centrifuged for three minutes.

With certain paraffin base oils a portion of the paraffin is thrown down with the B.S. If the centrifuge tubes are heated to 150° F., the paraffin will melt and be dissolved in the gasoline-oil mixture and usually will not be thrown down again with the B.S. upon centrifuging while hot. However, occasionally the paraffin will re-congeal as the tube cools during centrifuging. If this occurs, the tube is removed from the centrifuge and heated to 150° F. without shaking or disturbing the settled B.S. layer. The heated sample is then centrifuged for 15 seconds. This should give a true B.S. reading free of paraffin.

An excess chemical grind-out is then run on each centrifuge by adding several drops of a 20% solution in white gasoline or other solvent of a chemical which causes complete separation of the water and oil. With some sensitive emulsions the chemical will cause re-emulsification. In these instances it is necessary to re-thief and add a lesser amount. Each tube is shaken vigorously to make sure that the B.S. layer is broken up and the tubes heated to 150° F. in the case of troublesome paraffin base crude oil. The samples are then centrifuged for three minutes.

During the test the speed of the water drop is observed carefully after the emulsion breaking chemical is added to the prescription bottles. The observation of the color and brilliance of the oil in transmitted light is very important. In general, the brilliance and depth of color increases with a decrease in B.S. and W. (bottom settlings and water) content. The observations of color are made in the oil in the prescription bottles before and after heat treatment. In the ideal treatment of crude oil emulsions the oil-water line should be a sharp, clean line without any web or sludge present. Presence of a considerable amount of sludge or web is undesirable because this foreign material will eventually go to stock in the treating plant and be reported as B.S. traces of web or sludge, however, will disappear or be removed in the normal treating plant.

In almost all instances the thief grind-out and excess chemical grind-out readings indicate the formula that has most nearly produced crude oil free from B.S. and water. The most efficient emulsion breaking chemical is determined by the foregoing test procedure by the overall consideration of the following factors: relative speed of the breaking of the emulsion which is usually indicated by speed of water drop, color and brilliance of the oil layer, the relative absence of web or sludge at oil-water line and the ability to most nearly produce treated oil that is free from B.S. and water.

In most cases it is desirable to combine the active emulsion breaking chemical with a water coalescing agent.

The following Table VII lists three different emulsions and some of their physical characteristics that were used to test the compositions of Table VI.

TABLE VII

| Emulsion No. | Gravity | Brine |
|---|---|---|
| F3 | Medium | Medium |
| F7 | Low | Low |
| F9 | Medium | Medium |

NOTE.—Gravity: Low=15 API or under; Medium=16–25 API; High=26 API and up. Brine: Low=under 15,000 p.p.m. NaCl; Medium=15–35,000 p.p.m. NaCl; High=35,000 p.p.m. NaCl.

The compositions of Table VI were then tested according to the bottle test of crude oil emulsions previously described. The emulsions of Table VII were used.

TABLE VIII

| Product No. | Emulsion No. | Dosage (p.p.m.) | Thief grind-out B.S. | Thief grind-out Water | Excess grind-out, water |
|---|---|---|---|---|---|
| E1 | F9 | 150 | 1.2 | 2.0 | 3.0 |
| E5 | F9 | 150 | 0.5 | 1.5 | 2.0 |
| E85 | F9 | 150 | 2.2 | 0.2 | 2.0 |
| Blank | F9 | | 7.0 | 4.0 | 12.0 |
| Standard emulsion breaker | F3 | 150 | 1.1 | Tr | 1.2 |
| E34 | F3 | 150 | 0.6 | Tr | 0.5 |
| E36 | F3 | 150 | 0.3 | 0.1 | 0.3 |
| E55 | F7 | 200 | 7.2 | 8.8 | 13.0 |
| E113 | F7 | 200 | 4.0 | 4.0 | 7.2 |
| E119 | F7 | 200 | 11.6 | 0.4 | 9.6 |
| E114 | F7 | 200 | 8.0 | 3.2 | 10.2 |
| E115 | F7 | 200 | 1.6 | 8.8 | 9.2 |
| E121 | F7 | 200 | 0.8 | 6.4 | 6.4 |

Careful examination of Table VIII will show the superiority of the compositions of this invention. For example, looking at the blank, a thief grind-out on this blank showed a water drop of 4.0%. An excess grind-out showed 12.0% water. On the other hand, with the chemical treatments E5 and E85, the excess grind-out in all cases showed 2.0% or less water. This indicates that the chemical was more successful in removing the water. Less water was left in the thief samples containing the chemicals than in the blank sample. Likewise, sample 5 using a standard emulsion breaker was not as effective as E34 or E36 in removing water and B.S. Product E119 was not as effective as E121. The difference is that E119 does not contain the polyoxyalkylated alkyl phenol-formaldehyde polycondensate combined with the copolymer so as to fall within this invention. E119 is merely a copolymer formed by reaction of 99.4% of a propoxylated t-butyl phenol-formaldehyde resin of molecular weight 1950 and 4 moles of ethylene oxide adduct with 0.6% of toluene diisocyanate.

SUMMARY

In summary, a new process and compositions for breaking water-in-oil petroleum emulsions. This composition is the combined formulation of (1) a copolymer of a diisocyanate and a polyoxyalkylated compound and (2) a polyoxyalkylated alkyl phenol-formaldehyde polycondensate.

What I claim and desire to protect by Letters Patent is:

1. A process for breaking petroleum emulsions of the water-in-oil type which comprises subjecting said emulsion to the demulsifying action of a substantially water-insoluble, at least partially oil-soluble product comprising:
 (A) a copolymer formed as the reaction product of:
   (1) from about 1 to 15% by weight of a diisocyanate, and
   (2) from about 85 to 99% by weight of a polyoxyalkylated compound selected from the group consisting of compounds having the formula:

$$H(OCH_2CH_2CH_2)_x(OR_1)_yOR_2$$

where $y$ is an integer from 2 to 70; $R_1$ is a radical selected from the group consisting of

   and
   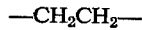

$R_2$ is a radical selected from the group consisting of —H and —CH(CH$_2$CH$_2$OH)$_2$; and $x$ is an integer from 0 to 40; and polyoxyalkylated alkyl phenol-formaldehyde polycondensates having the formula:

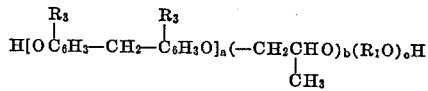

where $a$ is an integer from 1 to 8; $b$ is an integer from 1 to 40; $c$ is an integer from 0 to 40; $R_1$ is a radical selected from the group consisting of —CH$_2$CH$_2$— and

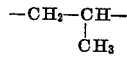

and $R_3$ is a hydrocarbon group having from 4 to 12 carbon atoms in chain length; and
 (B) polyoxyalkylated alkyl phenol-formaldehyde polycondensates having the formula:

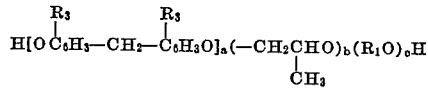

where $a$ is an integer from 1 to 8; $b$ is an integer from 1 to 40; $c$ is an integer from 0 to 40; $R_1$ is a radical selected from the group consisting of

   and
   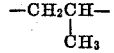

and $R_3$ is a hydrocarbon group having from 4 to 12 carbon atoms in chain length, wherein the ratio of A to B is within the range from 20:80 to 80:20 by weight.

2. The process of claim 1 wherein the diisocyanate has the formula:

$$O=C=N-R-N=C=O$$

where R is a hydrocarbon radical having from 4 to 14 carbon atoms.

3. The process of claim 2 wherein the diisocyanate has the formula:

$$O=C=N-R-N=C=O$$

where R is a radical selected from the group consisting of —(CH$_2$)$_6$—, —C$_6$H$_4$—,

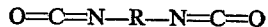

and —C$_6$H$_4$CH$_2$C$_6$H$_4$—.

4. The process of claim 2 wherein the diisocyanate of the copolymer comprises from 3 to 6% by weight of the copolymer.

5. The process of claim 2 wherein the emulsion is subjected to a solution of from 10 to 50% by weight of the substantially water-insoluble, at least partially oil-soluble product.

6. A composition useful for breaking petroleum emulsions comprising by weight:
 (A) from 20 to 80% of a copolymer formed as the reaction product of:
   (1) from about 1 to 15% by weight of a diisocyanate, and
   (2) from about 85 to 99% by weight of a polyoxyalkylated compound selected from the group consisting of compounds having the formula:

$$H(OCH_2CH_2CH_2)_x(OR_1)_yOR_2$$

where $y$ is an integer from 2 to 70; $R_1$ is a radical selected from the group consisting of

   and

$R_2$ is a radical selected from the group consisting of —H and —CH(CH$_2$CH$_2$OH)$_2$; and $x$ is an integer from 0 to 40; and polyoxylated alkyl phenol - formaldehyde polycondensates having the formula

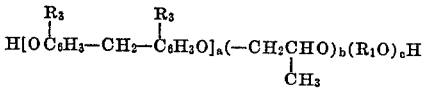

where $a$ is an integer from 1 to 8; $b$ is an integer from 1 to 40; $c$ is an integer from 0 to 40; $R_1$ is a radical selected from the group consisting of —CH$_2$CH$_2$— and

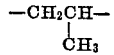

and $R_3$ is a hydrocarbon group having from 4 to 12 carbon atoms in chain length; and
 (B) from 20 to 80% of polyoxyalkylated alkyl phenol-formaldehyde polycondensates having the formula:

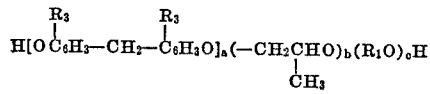

where $a$ is an integer from 1 to 8; $b$ is an integer from 1 to 40; $c$ is an integer from 0 to 40; $R_1$ is a radical selected from the group consisting of $$-CH_2CH_2-$$

and $$-CH_2CH- \\ \phantom{-CH_2}|\\ \phantom{-CH_2}CH_3$$

and $R_3$ is a hydrocarbon group having from 4 to 12 carbon atoms in chain length.

7. The composition of claim 6 wherein the diisocyanate has the formula:

$$O=C=N-R-N=C=O$$

where R is a hydrocarbon radical having from 4 to 14 carbon atoms.

8. The composition of claim 6 wherein the diisocyanate has the formula:

$$O=C=N-R-N=C=O$$

where R is a radical selected from the group consisting of $-(CH_2)_6-$, $-C_6H_4-$, $$-C_6H_3- \\ \phantom{-C_6}|\\ \phantom{-C_6}CH_3$$

and $-C_6H_4CH_2C_6H_4-$.

9. The composition of claim 6 wherein the diisocyanate of the copolymer comprises from 3 to 6% by weight of the copolymer.

10. The composition of claim 6 wherein the emulsion is subjected to a solution of from 10 to 50% by weight of the substantially water-insoluble, at least partially oil-soluble product.

References Cited

UNITED STATES PATENTS 2,929,800  3/1960  Hill, Jr. _____ 260—77.5 AM
3,404,095  10/1968  Colburn _____ 252—358

JOHN D. WELSH, Primary Examiner

U.S. Cl. X.R.

252—331, 358

UNITED STATES PATENT OFFICE
CERTIFICATE OF CORRECTION

Patent No. 3,640,894    Dated 2-8-72

Inventor(s) Ronald G. Sampson

It is certified that error appears in the above-identified patent and that said Letters Patent are hereby corrected as shown below:

Column 2, line 41, for "cyaante" read -- cyanate --.
Column 3, line 55, for " $-C_6H_4-$ " read -- $-C_6H_3-$ --.

Column 4, Table II, for "  " corrected table see attached sheet.

| Compound | Melting point, °C. | Boiling point, °C. | Specific gravity | Refractive index, $n_D$ | Flash point, open-cup. °C. |
|---|---|---|---|---|---|
| 1. Hexamethylene diisocyanate | | $127_{11}$ | $1.05_4^{20}$ | $1.4530^{20}$ | 140 |
| 2. m-Phenylene diisocyanate | 51 | $110_{11}$ | | $1.5573^{60}$ | 107 |
| 3. 2,4-toluene diisocyanate | 22 | $120_{10}$ | $1.22_{15}^{25}$ | $1.5654^{25}$ | 132 |
| 4. 80/20-toluene diisocyanate [1] | [2] 11-14 | $120_{10}$ | $1.22_{15}^{25}$ | $1.5666^{25}$ | 132 |
| 5. 65/35-toluene diisocyanate [3] | [2] 3-5 | $120_{10}$ | $1.22_{15}^{25}$ | $1.5663^{25}$ | 132 |
| 6. 4,4'-diphenylmethane diisocyanate | 38 | $196_{0.4}$ | $1.19^{50}$ | $1.5906^{60}$ | 201 |
| 7. Dianisidine diisocyanate | 116+ | $200-210_{0.4}$ | | | 245 |
| 8. Tolidine diisocyanate | 69+ | $160-170_{0.4}$ | | | 214 |

[1] 80/20 refers to the ratio of 2,4-toluene diisocyanate.
[2] Freezing point.
[3] 65/35 refers to the ratio of 2,6-toluene diisocyanate.

Column 8, line 30, for "traces" read -- Traces --.

UNITED STATES PATENT OFFICE
CERTIFICATE OF CORRECTION

Patent No. 3,640,894                    Dated 2-8-72

Inventor(s) Ronald G. Sampson

It is certified that error appears in the above-identified patent and that said Letters Patent are hereby corrected as shown below:

TABLE II

| Compound | Melting Point, °C | Boiling Point, °C | Specific Gravity | Refractive Index, $n_D$ | Flash Point, Open-cup, °C |
|---|---|---|---|---|---|
| 1. hexamethylene diisocyanate | – | $127_{10}$ | $1.05^{20}_4$ | $1.4530^{20}$ | 140 |
| 2. m-phenylene diisocyanate | 51 | $110_{11}$ | – | $1.5573^{80}$ | 107 |
| 3. 2,4-toluene diisocyanate | 22 | $120_{10}$ | $1.22^{25}_{15}$ | $1.5654^{25}$ | 132 |
| 4. 80/20-toluene diisocyanate* | 11-14[a] | $120_{10}$ | $1.22^{25}_{15}$ | $1.5666^{25}$ | 132 |
| 5. 65/35-toluene diisocyanate** | 3-5[a] | $120_{10}$ | $1.22^{25}_{15}$ | $1.5663^{25}$ | 132 |
| 6. 4,4'-diphenylmethane diisocyanate | 38 | $196_8$ | $1.19^{50}$ | $1.5906^{50}$ | 201 |
| 7. dianisidine diisocyanate | 116+ | $200-210_{0.8}$ | – | – | 245 |
| 8. tolidine diisocyanate | 69+ | $160-170_{0.8}$ | – | – | 214 |

\* 80/20 refers to the ratio of 2,4-toluene diisocyanate
\*\* 65/35 refers to the ratio of 2,6-toluene diisocyanate a  freezing point Signed and sealed this 5th day of September 1972.

(SEAL)
Attest:

EDWARD M. FLETCHER, JR.                 ROBERT GOTTSCHALK
Attesting Officer                       Commissioner of Patents